(12) United States Patent
Dogru et al.

(10) Patent No.: US 11,654,512 B2
(45) Date of Patent: May 23, 2023

(54) APPARATUS AND METHOD FOR 3D LASER PRINTING BY FUSING METAL WIRE MATERIAL

(71) Applicants: John Mehmet Ulgar Dogru, Dallas, TX (US); Anton Vedeshin, Tallinn (EE)

(72) Inventors: John Mehmet Ulgar Dogru, Dallas, TX (US); Anton Vedeshin, Tallinn (EE)

( * ) Notice: Subject to any disclaimer, the term of this patent is extended or adjusted under 35 U.S.C. 154(b) by 641 days.

(21) Appl. No.: 16/739,874

(22) Filed: Jan. 10, 2020

(65) Prior Publication Data

US 2021/0213562 A1    Jul. 15, 2021

(51) Int. Cl.
*B23K 26/06* (2014.01)
*B29C 64/314* (2017.01)
(Continued)

(52) U.S. Cl.
CPC ...... *B23K 26/0648* (2013.01); *B23K 26/0604* (2013.01); *B29C 64/118* (2017.08);
(Continued)

(58) Field of Classification Search
CPC ... B29C 64/314; B29C 64/321; B29C 64/118; B29C 64/205; B29C 64/00; B29C 64/336; B29C 48/92; B29C 64/295; B29C 64/20; B29C 64/40; B29C 64/124; B29C 64/393; B29C 64/53; B29C 64/153; B29C 64/268; B29C 64/277; B29C 64/10; B29C 64/379; B29C 64/264; B29C 64/386; B29C 64/236; B29C 64/245; B23K 26/0604; B23K 26/34; B23K 26/04; B23K 26/354; B23K 9/324; B23K 26/342; B23K 26/32; B23K 26/76;
(Continued)

(56) References Cited

U.S. PATENT DOCUMENTS

| | | | |
|---|---|---|---|
| 2012/0248093 A1* | 10/2012 | Ulrich | H05B 6/14 219/600 |
| 2013/0243375 A1* | 9/2013 | Poisel | G02B 6/3604 385/26 |

(Continued)

FOREIGN PATENT DOCUMENTS

| | | |
|---|---|---|
| CN | 103878370 | 1/2017 |
| CN | 106363920 | 2/2017 |

(Continued)

OTHER PUBLICATIONS

Miguel Zavala-Arredondo, et al. "Laser diode area melting for high speed additive manufacturing of metallic components", Materials & Design, vol. 117, 2017, pp. 305-315, ISSN 0264-1275, https://doi.org/10.1016/j.matdes.2016.12.095. (Year: 2017).*

*Primary Examiner* — Dana Ross
*Assistant Examiner* — Kuangyue Chen

(57) ABSTRACT

The apparatus for 3D laser printing by fusing a metal wire material is provided. The zone of fusion is heated and fused by a plurality of laser beams which uniformly converge into the focal area around the tip of the metal wire material by a focusing lens into a focal point on an object-formation table. The optical and wire feeding units are stationary, while the object-formation table is moveable under command of a computer along a pre-programmed spatial trajectory.

2 Claims, 5 Drawing Sheets

(51) Int. Cl.
*B29C 64/321* (2017.01)
*B29C 64/118* (2017.01)
*B33Y 10/00* (2015.01)
*B33Y 30/00* (2015.01)

(52) U.S. Cl.
CPC .......... *B29C 64/314* (2017.08); *B29C 64/321* (2017.08); *B33Y 10/00* (2014.12); *B33Y 30/00* (2014.12)

(58) Field of Classification Search
CPC ................ B23K 26/02; B23K 26/0665; B23K 26/0608; B23K 26/044; B23K 26/06; B23K 26/0006; B23K 26/703; B23K 26/073; B23K 26/064; B23K 15/0006; B23K 15/0093; B23K 26/03; B23K 15/0013; B23K 15/03; B23K 37/0426; B23K 26/36; B23K 26/702; B23K 26/704; B23K 26/16; B23K 26/1224; B23K 37/0408; B23K 15/002; B23K 15/06; B23K 26/123; B23K 26/0622; B23K 26/14; B23K 35/36; B23K 35/40; B23K 9/04; B23K 26/0624; B23K 15/0086; B23K 9/167; B23K 9/173; B23K 9/133; B23K 9/126; B23K 9/073; B23K 28/02; B23K 26/348; B23K 9/235; B23K 26/046; B23K 26/0626; B23K 35/22; B23K 26/0652; B23K 26/067; B23K 9/23; B23K 9/1006; B23K 9/125; B23K 9/16; B23K 10/027; B23K 26/1272; B33Y 10/00; B33Y 30/00; B33Y 40/00; B33Y 80/00; B33Y 50/02; B33Y 50/00; B33Y 70/00; B33Y 99/00; B33Y 99/46; B22F 10/00; B22F 12/00; B22F 3/00; B22F 12/55; B22F 10/10; B22F 10/22; B22F 12/57; B22F 7/06; B22F 12/41; B22F 12/44; B22F 12/45; B22F 10/20; B22F 10/36; B22F 12/20; B22F 10/80; B22F 10/12; B22F 12/43; B22F 12/17; B22F 10/25; B22F 10/28; B22F 12/49; B22F 12/33; B22F 10/34; B22F 12/38; B22F 10/70; B22F 12/70; B22F 12/90; B22F 12/88; B22F 3/24; B22F 10/30; B22F 5/12; B28B 1/001; C04B 35/573; C04B 35/62277; G02B 6/02052; G02B 15/04; G02B 7/16; G02B 15/10; G02B 19/0047; G02B 7/14; G02B 7/1827; G02B 19/0028; H01S 5/4012; H01S 5/005; H01S 3/005; H01S 3/2383; H01S 3/067; H01S 3/0071; B25J 11/00; G05B 17/02; G02F 1/0136; G02F 1/135; G02F 1/133362; B41J 2/04; B41J 2/14104; B21C 3/08; B21C 33/02; H05B 6/10; B41F 19/005; C23C 14/048; C23C 14/28; C23C 14/246; C23C 16/513
See application file for complete search history.

(56) References Cited

U.S. PATENT DOCUMENTS

2016/0322777 A1* 11/2016 Zediker ................. H01S 5/4062
2018/0345573 A1* 12/2018 Zinniel ................... B21C 33/02
2019/0009369 A1* 1/2019 Vorontsov .......... B23K 26/0608
2019/0160594 A1   5/2019 Flamm et al.
2019/0270246 A1* 9/2019 Fujishima ............... B22F 12/53

FOREIGN PATENT DOCUMENTS

| CN | 108380881 A * | 8/2018 | ............ B22F 3/1055 |
| KR | 20190011357 A | 2/2019 | |
| WO | WO-2019102013 A1 * | 5/2019 | ........... H02G 1/1253 |

* cited by examiner

APPARATUS AND METHOD FOR 3D LASER PRINTING BY FUSING METAL WIRE MATERIAL

FIELD OF THE INVENTION

The present invention relates to laser printing, more particularly to 3D laser printing, and specifically to an apparatus and a method for 3D laser printing by fusing a metal wire material. The invention may find use in additive manufacturing for the production of various models having intricate shapes the production of which by conventional manufacturing methods requires the use of a complicated and expensive equipment that involves multiple manufacturing steps, etc. The invention may also find use in creation of souvenir products, design of jewelry and interior items, creation of architectural models, creation of spare parts and technical structures, creation of trial packaging designs, and the like.

DESCRIPTION OF THE PRIOR ART

In spite of the fact that 3D laser printing is a rather recent technology, nowadays there exist already a great variety of various apparatuses and methods for employing this technology in the industry. The 3D printing technique can be realized by fusing and layering various materials in a liquid, powdered, and metal wire forms.

Description of 3D laser printing apparatuses and methods may be found in multiples patent and non-patent publications. Examples of some of patent publications are given below.

US Patent Application Publication No. 20190009369 (inventor: M. Vorontsov) published on Jan. 10, 2019 discloses an additive manufacturing in metals with a fiber array laser source and adaptive multi-beam shaping. The system uses a scalable array of individually controllable laser beams that are generated by a fiber array to process materials into an object. The adaptive control of individual beams may include beam power, focal spot width, centroid position, scanning orientation, amplitude and frequency, piston phase and polarization states of individual beams. Laser beam arrays may be arranged in a two dimensional cluster and configured to provide a pre-defined spatiotemporal laser power density distribution, or may be arranged linearly and configured to provide oscillating focal spots along a wide processing line. These systems may also have a set of material sensors that gather information on a material and environment immediately before, during, and immediately after processing, or a set of thermal management modules that pre-heat and post-heat material to control thermal gradient, or both.

Korean Patent Application Publication KR20190011357 (A) published on Feb. 7, 2019 (Inventors: Lee Min Ha, et al.) discloses a 3D method of high-resolution 3D printing using micro metal wire. The method includes the steps of: a) preparing a substrate; b) irradiating the micro metal wire on the substrate with a pulsed laser to prepare a metal layer formed by melting the micro metal wire; and c) cooling the metal layer to produce an amorphous micro laminate structure, The micro metal wire is a metal or alloy having a thermal conductivity of 10 W/mK or less and a melting point of 1000° C. or less. The micro metal wire having an average diameter of 60 to 150 μm provides high resolution of 3D printing. A power of the pulse laser is within a range of 40 W to 90 W.

Chinese Patent No. CN103878370 issued on Jan. 18, 2017 to L. Wang discloses metal 3D printer production equipment. The equipment is characterized in that the product construction working platform makes three-dimensional motion in the X axis, Y axis, and Z axis under the driving of printing software and a control system along a printing path controlled by product three-dimensional model layering data, so that 3D printing production of metal parts is achieved, small metal parts in any complicated three-dimensional shapes and large metal integrated components in any complicated three-dimensional shapes can be produced, a whole metal 3D printing system is arranged in an airtight room, and the metal 3D printer production equipment can work in the protective atmosphere or in the atmospheric environment according to production technical requirements.

Chinese Patent Application Publication No. CN106363920 (Inventors: Y. Zhang, et al) published on Feb. 1, 2017 discloses a 3D printing device and method based on fused deposition. An annular plug is placed in a working cavity, and the height of the liquid level at the upper end of a spray nozzle is kept constant by controlling movement of the annular plug, so that molten metal flows out of the spray nozzle continuously at a constant speed, and then 3D printing is achieved through a three-dimensional moving device installed on the spray nozzle. In the printing process, a roller is placed near the spray nozzle, a metal wire is precisely combined with a solidified matrix under the action of rolling force, and then the mechanical properties of metal parts are guaranteed and improved.

US Patent Application Publication No. 20190160594A1 published on May 30, 2019 (Inventors: J. Flamm, et al.) discloses systems and methods of additive structural build techniques. Alignment of the consumable wire electrodes is performed with the use of the sensors. The power source and the laser are configured to provide energy to melt at least the filler wire during the additive manufacturing process. In one embodiment, a metal deposition device is configured to deposit a metal material during an additive manufacturing process. A controller is operatively coupled to the metal deposition device and is configured to command the device to deposit the metal material on a base to form a contour of a part, to deposit the metal material on the base to form an infill pattern within a region outlined by the contour, and to fuse the infill pattern to the metal contour at crossover points, where the infill pattern meets the contour, by applying energy at the crossover points and reducing a deposition rate of the metal material at the crossover points to prevent distorting the contour.

US Patent Application Publication No. 20180345573 (Inventors: R. Zinniel, et al.) published on Dec. 6, 2018 discloses a system and method for 3D printing with metal filament materials. The system is configured to a 3D print using a metal wire material and includes a drive mechanism for feeding the metal feedstock into an inlet tube and a liquefier. The liquefier has a chamber for accepting the metal feedstock from the inlet tube. The metal feedstock is heated in the chamber such that a melt pool is formed in the chamber. The liquefier has an extrusion tube in fluid communication with the chamber, the extrusion tube having a length (L) and a diameter (D) wherein the ratio of length to diameter (L/D) ranges from about 4:1 to about 20:1. The system has a platen with a surface configured to accept melted material from the liquefier, wherein the platen and the liquefier move in at least three dimensions relative to each other. The system includes a regulated source of pressurized inert gas flowably coupled to the liquefier and configured to place a controlled positive pressure onto the melt pool sufficient to overcome the resistance of the extrusion tube such that a part may be formed by the extrusion of the liquid metal along toolpaths defined by the relative motion of the liquefier and the platen.

SUMMARY OF THE INVENTION

The invention relates to an apparatus and method for 3D laser printing by fusing a metal wire material. The apparatus contains an optical assembly that includes a plurality of laser sources with output optical fibers, which emit laser beams into a plurality of respective collimators for collimating the received laser beams. The collimated beams are directed to a focusing lens that focuses them into a focal point on an object-formation table. The apparatus is further provided with a wire feeding mechanism for feeding the metal wire material in a linear direction down to contact with the object-formation table. On its way in the downward direction, the wire material is maintained under tension due to a dragging force produced between two pairs of feeding rollers and passes through a wire-heating unit for heating the metal wire material to a given temperature, at which the material is released from internal stresses and naturally straightens. The optical assembly and the wire guiding mechanism with the heating unit are stationary, while the motion-formation table is movable and has at least three degree of freedom. As a result, when the wire material is fused under the action of the collimated laser beams converging at the focal point on the object-forming table, the 3D configuration of the object is obtained due to spatial motions of the table controlled by a pre-programmed computer.

The method of the invention for 3D laser printing by fusing metal wire material consists of the following steps: providing a metal wire material which has a free end facing the object-forming table; feeding the wire in a linear direction toward the object-forming table; heating the wire on its way to the object-forming table to a temperature below the fusion point of the wire material; emitting laser beams from a plurality of laser sources; collimating the laser beams emitted from the laser sources in a uniform tapered configuration; focusing the collimated beams of the uniform tapered configuration onto the free end of the wire when the free end comes into contact with the object-forming table, thus fusing the wire material to obtain a fused wire material; and performing formation of the 3D object by spatially moving the object-forming table relative to the wire along a spatial trajectory that corresponds to a shape of a 3D object being formed.

Main distinction of the apparatus and method of the invention over the prior art is that the area of fusion is heated and fused not by a single beam but rather by a plurality of laser beams uniformly converged into the focal area circumferentially around the tip of the wire material in the zone of fusion. This feature provides uniform distribution of heat and symmetry in the structure of the formed object. Such a system with circumferentially uniformly distributed laser beams is more advantageous for a metal wire as a material for fusion than a system based on emission of laser beams from a plurality of optical fibers combined into a bundle. Another distinction from prior-art system of this type is a provision of a special optical lens with a central opening for passing a wire-feeding system.

DETAILED DESCRIPTION OF THE INVENTION

The present invention relates to laser printing, more particularly to 3D laser printing, and specifically to an apparatus and a method for 3D laser printing by fusing a metal wire material. Although the following description refers mainly to a metal wire material, the apparatus and method of the invention are equally applicable to conductive plastic rods or filaments.

Figure 1:
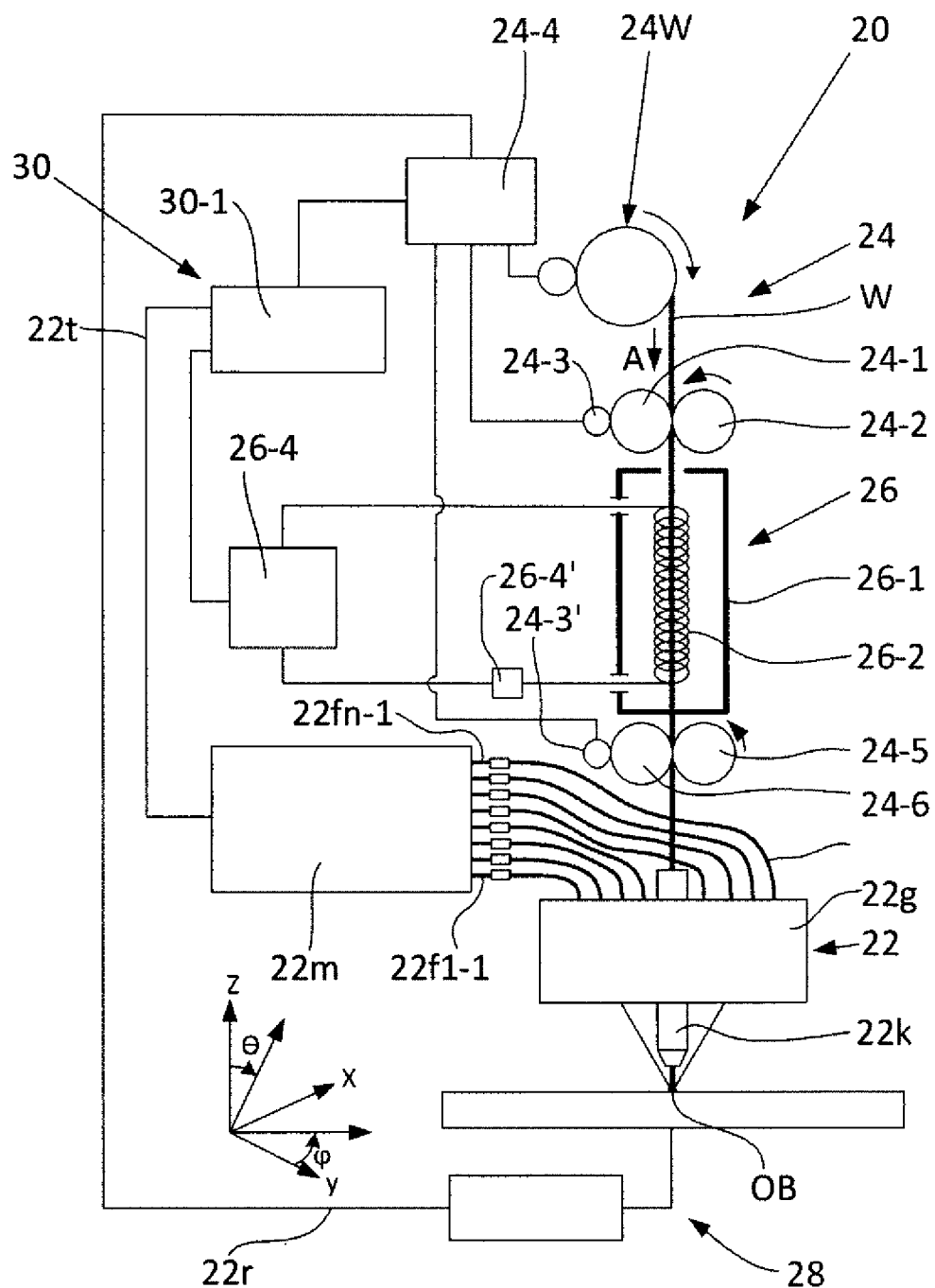
FIG. 1 is a general schematic view of the apparatus of the invention for 3D laser printing by fusing metal wire material.

A general schematic view of the apparatus of the invention for 3D laser printing by fusing metal wire material is shown in FIG. 1, wherein the entire apparatus, which hereinafter will be called a printing apparatus, is designated by reference numeral 20. As can be seen from FIG. 1, the printing apparatus 20 consists of the following four major parts: an optical assembly 22, a wire feed assembly 24, a wire heating system 26, an object-formation table 28 with at least three degrees of freedom, and a control system 30 that includes a computer 30-1.

Let us consider each assembly and system separately in more detail.

Figure 2:
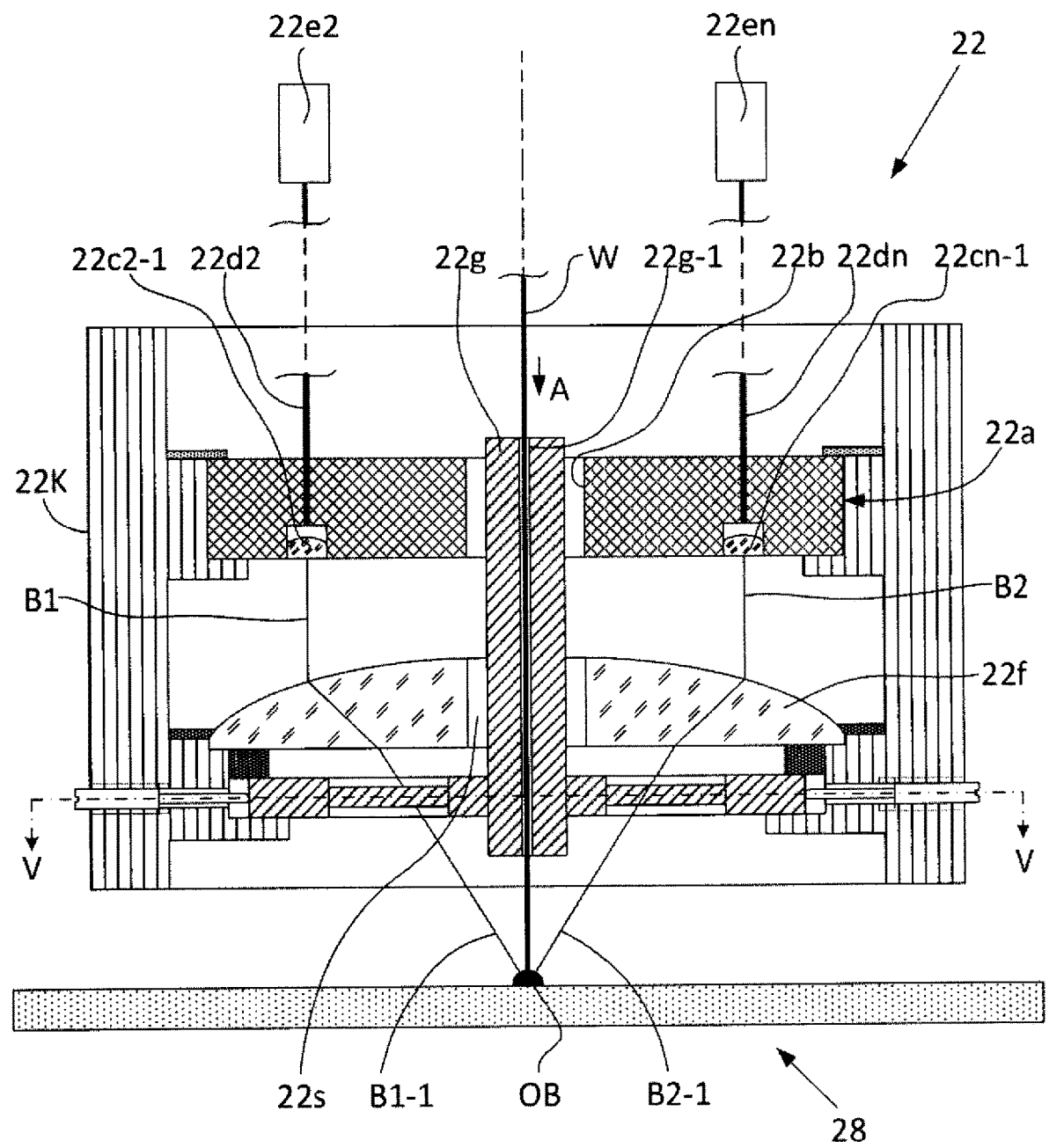
FIG. 2 shows the structure of an optical assembly of the apparatus of FIG. 1.
Figure 3:
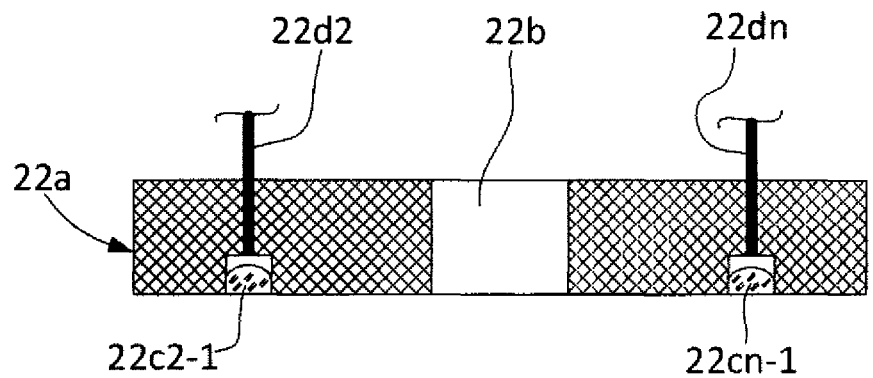
FIG. 3 is a vertical sectional view of an optical fiber holder used in the optical assembly of FIG. 2.
Figure 4:
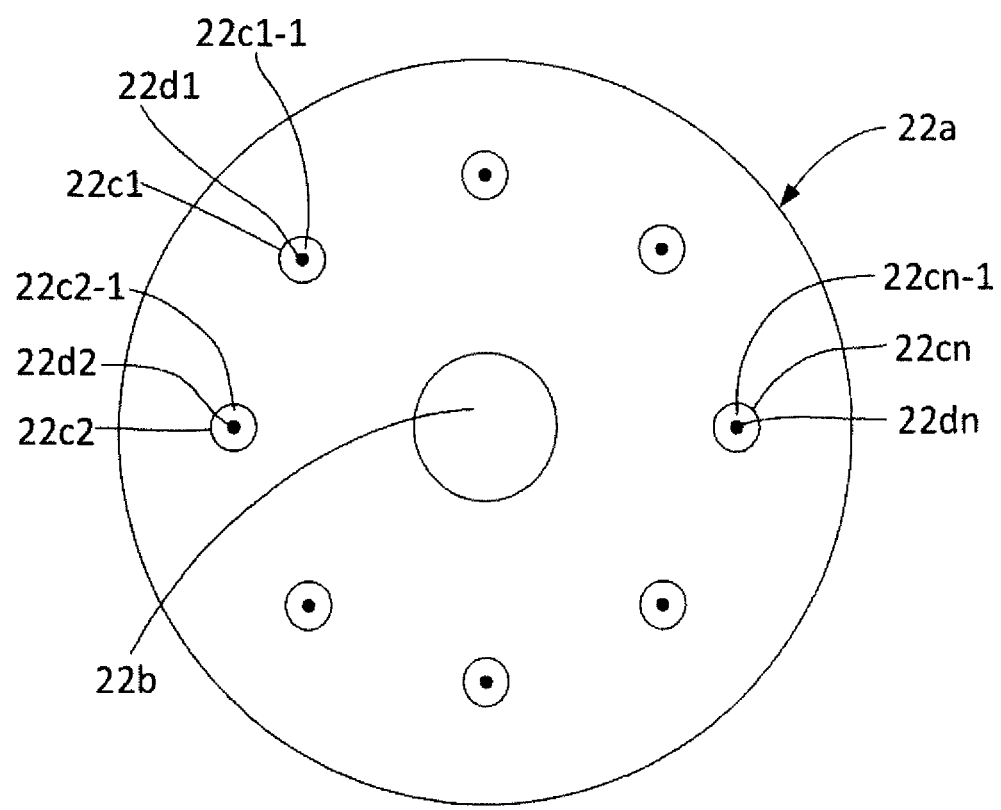
FIG. 4 is a bottom view of the optical fiber holder of FIG. 2.

The optical assembly 22 is shown mainly in FIGS. 2, 3, and 4, where FIG. 2 is a vertical sectional view of a beam formation and focusing part. FIG. 3 is a vertical sectional view of an optical fiber holder 22a, and FIG. 4 is a bottom view of the optical fiber holder 22a. The optical fiber holder 22a has a disk-like shape with a central opening 22b and a plurality of openings 22c1, 22c2, 22cn arranged circumferentially uniformly on a circle concentric to the central opening 22b. Inserted into the openings 22c1, 22c2, 22cn are optical collimators 22c1-1, 22c2-1, . . . 22cn-1 for collimation of beams (such as beams B1 and B2) emitted from the open ends of output optical fibers 22d1, 22d2, 22dn, which pass through the body of the optical fiber holder 22a and coupled to the respective collimators 22c1-1, 22c2-1, . . . 22cn-1. The optical fibers have cores of 200 microns with a cladding of 600 to 800 microns and with a numerical aperture of 0.22.

In FIG. 2, reference numeral 22e2 and 22en designate optical fiber connectors for connection of output optical fibers 22d1, 22d2, 22dn to respective laser sources, which is described below. It is understood that although only two such connectors are shown in FIG. 2, the number of such connectors corresponds to the number of collimators and the number of fibers. Although only eight openings 22c1, 22c2, 22cn, optical collimators 22c1-1, 22c2-1, . . . 22cn-1, and optical fibers 22d1, 22d2, 22dn are shown in the drawings, it is understood that eight of each of them are shown only as an example and should not construe the scope of the invention application.

Reference numeral 22f designates a beam converging and focusing optical system for converging and focusing the beams such as beams B1 and B2 emitted from the collimators. In the modification shown in FIG. 2, the beam converging and focusing optical system 22f is represented by a single aspherical lens, although a group of several optical lenses may be used for the same purpose. The lens 22f also may be a graded index lens (GRIN lens). The collimated and focused beams, only two of which are shown as beams B1-1 and B2-1, are focused into point OB on the object-formation table 28, where a 3D object (not shown) is to be formed by a 3D printing process carried out with the use of the 3D printing apparatus 20 of the invention.

The lens 22f has a central opening 22s, which is concentric to the opening 22b1 of the optical fiber holder 22a and to a wire guiding ferrule 22g that guides a fusion wire material W. The wire-guiding ferrule passes through the openings 22b and 22s. The ferrule 22g has an outer diameter smaller than the inner diameter of the openings 22b and 22s, respectively, to provide a certain freedom for motion of the ferrule 22g in the radial directions of the openings. The metal wire W is guided through the central opening 22g1 of the ferrule 22g with a sliding fit and a free end of the wire material protrudes from the ferrule.

Figure 5:
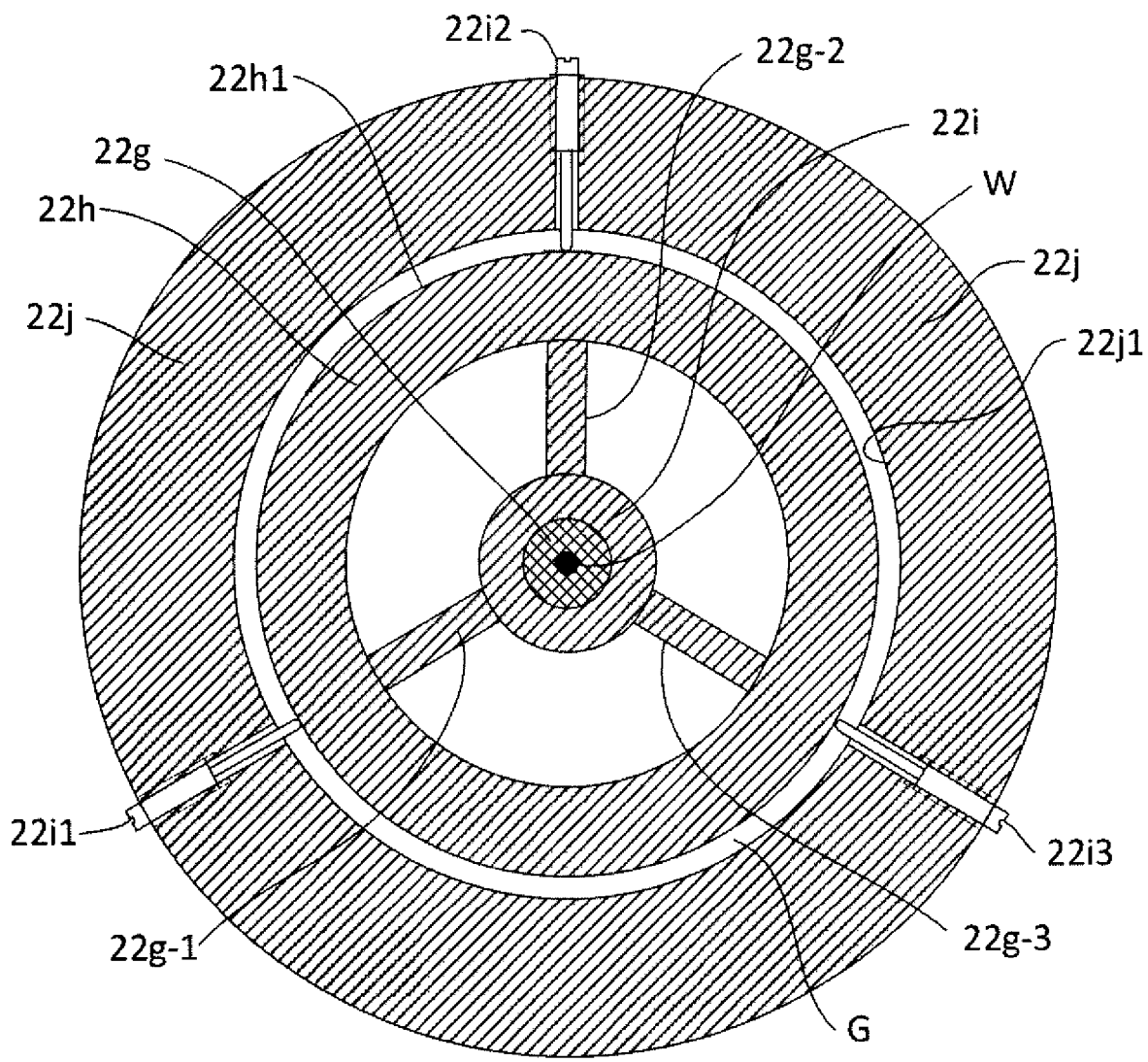
FIG. 5 is a cross-section along line V-V of FIG. 2. controller

FIG. 5 is a cross sectional view along line V-V of FIG. 2. It can be seen from FIG. 2 and FIG. 5 that the lower end of the ferrule is rigidly fixed in the central part 22i of an inner annular body 22h. The latter is connected to the inner annular body 22h by radial ribs 22g-1, 22g-2, and 22g-3. Three ribs are shown only as an example and the number of the ribs may be different. The center of the inner annular body 22h is coaxial with the central opening 22g1 of the ferrule 22g.

The inner annular body 22h is encompassed by an outer annular body 22j the inner diameter of which is slightly greater than the outer diameter of the inner annular body 22h so that an annular gap G is formed between the outer circular surface 22h1 of the inner annular body 22h and the inner circular surface 22j1 of the outer annular body 22j so that radial shift of the inner annular body 22h relative to the outer annular body 22j, and hence of the wire guiding ferrule 22g with the wire W relative to the inner annular body 22h is possible. The aforementioned radial shift is provided by means of micro-screws 22i1, 22i2, and 2213, which are screwed into the outer annular body 22j in a radial direction toward the inner annular body 22h so that the ends of these screws thrust into the outer circular surface of the inner annular body 22h. As can be seen from FIG. 5, the axes of the micro-screws 2211, 2212, and 22i3 are aligned with the radial ribs 22g-1, 22g-2, and 22g-3 but this condition is not compulsory. It is understood that the inner annular body 22h, and hence the ferrule 22g, is shifted to such a position in which the end of the metal wire material W that protrudes from the ferrule 22g to the table 28 is located in the focal point of the beams B1-1, B2-2 (only two such beams are conventionally shown since such beams form a conical surface converging in the downward direction). In FIG. 2, the focal point coincides with point OB. The aforementioned beam freely pass to the object-formation table 28 through the spaces between the ribs 22g-1, 22g-2, and 22g-3.

Normally, the above-described wire alignment operation, which is performed with the fiber position alignment mechanism consisting of the ferrule 22g, the inner annular body 22h, the outer annular body 22j, and the screws 22i1, 22i2, and 2213 are aligned with the radial ribs 22g-1, 22g-2, and 22g-3, is not needed for a routine 3D printing operation and is performed only for setting the apparatus 20 prior to use after purchasing or in case of accidental misalignment.

It is also understood that fusion of the metal wire material W by the light energy of the beams B1-1, B2-2 occurs exactly in point OB. Alignment of the lower end of the wire W in contact with the platform 28 is carried out manually or automatically. In case of the automatic alignment, the screws should be provided with individual rotary drives having drivers connected to the computer and activated via a feedback from visual sensors that determine positions of the wire relative to the focal point OB. The automatic shift adjustment system is beyond the scope of the present invention.

The wire feed assembly 24 includes a bobbin 24W onto which the metal wire material W is wound and from which the wire is unwound with some dragging by a pair of upper wire feeding rollers 24-2 and 24-3 between which the wire is guided. The rollers, which form a wire feeding mechanism, are in a friction engagement with the wire and have wire guiding V-grooves (not shown) on their peripheries. One of the rollers, e.g., the roller 24-1 is driven by a motor 24-3 controlled by the computer 30-1 via a controller 24-4.

Located below the upper feeding rollers are a pair of lower feeding rollers 24-5 and 24-6, which further drag the metal wire material W downward in a linear direction of arrow A towards the contact with the object-formation table 28. The rollers 24-5 and 24-6 are identical to rollers 24-1 and 24-2 and one of them has a drive motor 24-3' controlled from the controller 24-4.

In the area between the upper rollers 24-1, 24-2 and the lower rollers 24-5, 24-6, the metal wire material W passes through the wire heating system 26. The heating system 26 contains a heat-insulated casing 26-1, preferably of a cylindrical shape, and an inductive heating coil 26-2, which encompasses the wire W in its way in the downward direction. The heating system 26 further includes an AC generator 26-4 operating on a frequency, e.g., of tens to hundreds MHz and having a power, e.g., of several hundred Watts. It is understood that these numbers are given as examples. Reference numeral 26-4' designates a matching unit for matching impedances of the heating coils with output impedances of the AC generator 26-4.

Figure 6:
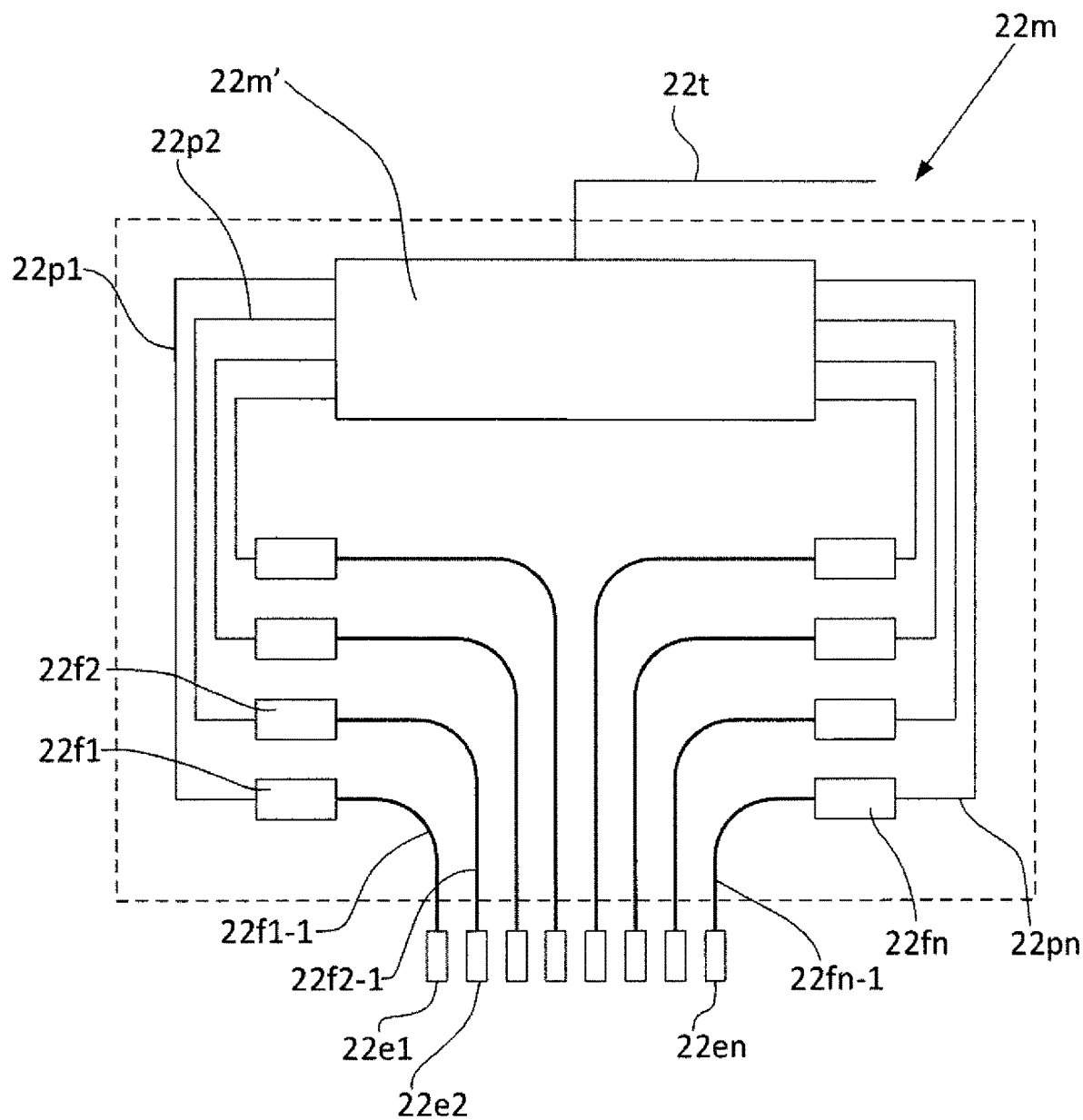
FIG. 6 is a diagram of a laser connection for connecting a plurality of lasers to a common driver and connectors.

As mentioned above, reference numerals 22e2 and 22en in FIG. 2 designate optical fiber connectors for connection of optical fibers 22f2-1 and 22fn-1 to respective laser sources 22d2 and 22fn. In fact, as shown in FIG. 6, there is a plurality of such optical fibers 22f1-1, 22f2-1, 22fn-1 that are connected to a plurality of respective laser sources 22f1, 22f2, . . . 22fn. Reference numeral 22k designates a casing of the optical assembly 22. Laser sources 22f1, 22f2, . . . 22fn are connected with the wires 22p1, 22p2, 22pn that terminate in a common driver 22m' in the unit 22m. The latter is connected to the computer 30-1 via a wire 22t. The laser sources 22f1, 22f2, . . . 22fn are laser diodes that have a wavelength from 360 to 1500 nm. Such a range is selected because high-power lasers currently existing in the industry operate only in the indicated range.

The object-formation table 28, which support an object, e.g. a substrate (not shown), on which the 3D printing operation of building up the material of the metal wire W is performed, has at least three degrees of freedom for moving the substrate relative to the lower end of the metal wire W during the operation.

An object-formation table 28 may be represented by the effector of an industrial robot arm having six-degrees of freedom, which is disclosed in U.S. Pat. No. 8,243,730 issued on Aug. 14, 2012 to M. Nichols, et al. The end effector that holds a workpiece has driven mechanisms that provide the workpiece with at least five degrees of freedom such as linear motions in the directions of X, Y, Z axes and two turns at angles $\phi$ and $\theta$, as shown in FIG. 1. The end effector of the aforementioned patent provides such motions.

As mentioned above, motions of the table are controlled by the computer 30-1. Moving of the table may be controlled by stepper motors or servomotors, which are, in turn, are controlled by drivers that receive commands from a 3D printer motherboard (not shown) of the computer 30-1.

The structure of the object-formation table 28 and its driving mechanisms are beyond the scope of the present invention. The angles φ and θ are shown as examples. The table 28 may be provided with a heating device for preheating of the object being treated to a temperature needed to reduce the power consumed by the wire heating system 26. The table 28 may have a special coating to increase adhesion (metal plate, ceramics, sand). The 3D printer motherboard runs software, which receives control commands from another computer, cloud, or a private server.

The apparatus 20 for 3D laser printing by fusing the metal wire material W operates as follows.

Let us assume that, as shown in FIG. 1, that the metal wire material W is unwound from the bobbin 24-1 and guided by the wire feed assembly 24 through the wire heating system 26 toward an object (not shown) on the object-formation table 28 but the end of the wire is still in the upper part of the wire guiding ferrule 22g. In the course of feeding of the wire W through the wire heating system 26, the wire W is maintained in a stretched state due to the dragging action between the upper pair of rollers 24-1, 24-2 and the lower pair of rollers 24-5, 24-6. In the section of the heating device between the upper pair of rollers 24-1, 24-2 and the lower pair of rollers 24-5, 24-6, the metal wire material W passes through the heating zone where the wire is subjected to contactless RF heating when passes through the inductive coil 26-2. The heating element in the form of a single inductive coil 26-2 is shown only as an example and heaters of any other type, which operates on frequencies higher those indicated above, may be employed for this purpose. The heating is performed to a temperature of the wire W below the point of fusion of the wire material at which all internal strains are eliminated and the wire naturally straightens. The end of the straightened wire reaches the focus area OB of the beams B 1-1 and B2-1, which have passed through the collimators 22c2-1, 22c2-2 . . . 22cn-1 and the focusing lens 22f to the focusing area OB. Although in FIG. 2 the focusing zone is shown as a point OB, in fact this zone will occupy some area. In this area, under the effect of the focusing beams the end of the metal wire material W is fused and in combination with spatial motions of the object-formation table 28, controlled by the computer (computers) 30, the thus-formed molten metal forms the 3D object envisaged by the program.

Thus, the main distinction of the apparatus and method of the invention over the prior art is that the area of fusion is heated and fused not by a single beam but rather by a plurality of laser beams uniformly converged into the focal area circumferentially around the tip of the wire material in the zone of fusion. This feature provides uniform distribution of heat and symmetry in the structure of the formed object. Such a system with circumferentially uniformly distributed laser beams is more advantageous for a metal wire as a material for fusion than a system based on emission of laser beams from a plurality of optical fibers combined into a bundle. Another distinction from prior-art system of this type is a provision of a special optical lens with a central opening for passing a wire-feeding system.

Although the invention was shown and described with reference to specific drawings, it is understood that images of these drawings, as well as the terms of the description should be construed as examples and that any other modifications and changes in the images and terminology may be used if they do not depart from the scope of the attached patent claims. For example, although the description relates exclusively to metal wire materials, the same principle is applicable to any other material made in the form of a wire, a thin rod, or filaments, e.g., from a conductive plastic. Laser source of different types or laser bars can be used. A focusing lens may comprise a multicomponent lens system provided with a central opening for passing the wire feed system.

The invention claimed is:

1. An apparatus for 3D laser printing by fusing a metal wire material, comprising:

an optical assembly comprising a plurality of laser sources with output optic fibers that emit laser beams; a plurality of optical collimators for receiving the laser beams emitted from the output optical fibers of the laser sources, the optical collimators collimating the laser beams of the laser sources into a plurality of collimated optical beams; at least one optical focusing lens that converges the collimated optical beams in a tapered configuration and focuses them into a focal point, the optical focusing lens having a central opening;

a wire feeding assembly comprising a wire feeding mechanism for feeding the metal wire material in a linear direction, the wire feeding mechanism having means for maintaining the metal wire material in tension, the metal wire material having a free end;

a heating assembly for heating the metal wire material to a given temperature in the course of feeding of the metal wire material;

an object-formation table that possesses at least three degrees of freedom for motions relative to the free end of the metal wire material;

an optical fiber holder that has a disk-like shape with a central opening and with a plurality of openings, which are arranged circumferentially uniformly on a circle concentric to the central opening and contain said collimators; and a fiber position alignment mechanism comprising a wire guiding ferrule into which the metal wire material is inserted with a sliding fit and which passes through said central opening of the optical fiber holder, an inner annular body in which the wire guiding ferrule is rigidly secured coaxially with the optical fiber holder by means of radial ribs; an outer annular body that encompasses the inner annular body with an annular gap therebetween; and screws, which are screwed into the outer annular body in a radial direction towards the inner annular body to contact with the inner annular body.

2. An apparatus for 3D laser printing by fusing a metal wire material, comprising:

an optical assembly comprising a plurality of laser sources with output optic fibers that emit laser beams; a plurality of optical collimators for receiving the laser beams emitted from the output optical fibers of the laser sources, the optical collimators collimating the laser beams of the laser sources into a plurality of collimated optical beams; at least one optical focusing lens that converges the collimated optical beams in a tapered configuration and focuses them into a focal point, the optical focusing lens having a central opening;

a wire feeding assembly comprising a wire feeding mechanism for feeding the metal wire material in a linear direction, the wire feeding mechanism having means for maintaining the metal wire material in tension, the metal wire material having a free end;

a heating assembly for heating the metal wire material to a given temperature in the course of feeding of the metal wire material; and an object-formation table that possesses at least three degrees of freedom for motions relative to the free end of the metal wire material, wherein the heating assembly comprises an inductive heating coil, which encompasses the metal wire material on its way to the object-formation table, and an AC generator;

an optical fiber holder that has a disk-like shape with a central opening and with a plurality of openings, which are arranged circumferentially uniformly on a circle concentric to the central opening and contain said collimators; and a fiber position alignment mechanism comprising a wire guiding ferrule into which the metal wire material is inserted with a sliding fit and which passes through said central opening of the optical fiber holder; an inner annular body in which the wire guiding ferrule is rigidly secured coaxially with the optical fiber holder by means of radial ribs; an outer annular body that encompasses the inner annular body with an annular gap therebetween; and screws, which are screwed into the outer annular body in a radial direction towards the inner annular body to contact with the inner annular body.

* * * * *